(12) United States Patent
Chen et al.

(10) Patent No.: US 9,382,789 B2
(45) Date of Patent: Jul. 5, 2016

(54) OIL SHALE EXPLOITATION METHOD

(71) Applicant: ENN Coal Gasification Mining Co., Langfang (CN)

(72) Inventors: Feng Chen, Langfang (CN); Hongtao Liu, Langfang (CN); Jun Qiao, Langfang (CN)

(73) Assignee: ENN COAL GASIFICATION MINING CO., Langfang (CN)

( * ) Notice: Subject to any disclaimer, the term of this patent is extended or adjusted under 35 U.S.C. 154(b) by 36 days.

(21) Appl. No.: 14/369,764

(22) PCT Filed: Dec. 24, 2012

(86) PCT No.: PCT/CN2012/087277
§ 371 (c)(1),
(2) Date: Jun. 30, 2014

(87) PCT Pub. No.: WO2013/097668
PCT Pub. Date: Jul. 4, 2013

(65) Prior Publication Data
US 2014/0352957 A1 Dec. 4, 2014

(30) Foreign Application Priority Data

Dec. 29, 2011 (CN) .......................... 2011 1 0452216

(51) Int. Cl.
| | | |
|---|---|---|
| *E21B 43/247* | (2006.01) | |
| *E21B 43/243* | (2006.01) | |
| *E21B 36/00* | (2006.01) | |
| *E21B 43/16* | (2006.01) | |
| *E21B 43/34* | (2006.01) | |
| *E21B 43/40* | (2006.01) | |

(52) U.S. Cl.
CPC ............... *E21B 43/243* (2013.01); *E21B 36/00* (2013.01); *E21B 43/164* (2013.01); *E21B 43/168* (2013.01); *E21B 43/34* (2013.01); *E21B 43/40* (2013.01); *E21B 43/247* (2013.01); *Y02P 90/70* (2015.11)

(58) Field of Classification Search
CPC ..... E21C 41/24; E21B 43/247; E21B 43/248; E21B 43/243; E21B 43/24; E21B 43/168; E21B 43/164
See application file for complete search history.

(56) References Cited

U.S. PATENT DOCUMENTS

2008/0283241 A1* 11/2008 Kaminsky ........... E21B 41/0064
166/245

FOREIGN PATENT DOCUMENTS

CN 101680284 A 3/2010

* cited by examiner

*Primary Examiner* — Zakiya W Bates

(57) ABSTRACT

An oil shale exploitation method comprises: forming a gas inlet pipeline (1) and a gas outlet pipeline (3) in an oil shale; forming a gasification channel (5) that connects the gas inlet pipeline and the gas outlet pipeline in the oil shale; feeding combustible gas and oxygen into the well through different gas inlet pipelines, and then igniting, in an aerobic environment, the combustible gas fed into the well at the lower opening of the pipeline for conveying the combustible gas, so as to heat the oil shale; and recycling through the gas outlet pipeline an oil-gas mixed product formed after thermal decomposition of kerogen in the oil shale.

15 Claims, 2 Drawing Sheets

OIL SHALE EXPLOITATION METHOD

FIELD OF THE INVENTION

The invention relates to the field of an in-situ underground oil shale exploitation method.

BACKGROUND OF THE INVENTION

An oil shale refers to a fine-grained sedimentary rock with high kerogen content and can be fractionated into a considerable amount of oils, and also refers to a solid combustible organic with more than 40% of ashes in percentage by weight and oil content ranging from 3.5% to 30%. The oil shale has more than 40% of ashes in percentage by weight compared to coals.

The oil shale must be heated to discharge hydrocarbon gases and fluids. For over 100 years, the oil shale is exploited by several ways worldwide, including on-ground processing, underground processing and combined processing. The on-ground processing includes mainly three steps such as oil shale exploitation and ore preparation, kerogen produced by thermal decomposition, and refined raw materials and usable chemicals produced by processing the kerogen, wherein it is known to commonly use a "underground exploitation and on-ground retorting" technique and a "on-ground exploitation and on-ground retorting" technique. With regard to the former, oil shale ores are exploited, conveyed to the ground surface and crushed, and then heated the processed ores in a container on the ground surface to produce fuel liquids and gases; and with regard to the latter, the oil shale ores are opencast, and then are subjected to crushing and retorting. The processed slag is accumulated in a mine field or other locations. As for the underground processing, oil shale resources are heated in a natural deposition environment of the oil shale to produce kerogen, thereby minimizing or eliminating exploitation procedures and thermal decomposition on the ground surface. Heats for previously achieving an underground temperature for thermal decomposition come from combustion at one end of oil shale accumulation while today, for example, it is attempted to accelerate heat transfer and fluid flow in the oil shale by fracturing a shale bed, thereby improving thermal decomposition efficiency and oil recovery in underground combustion. As for combined processing, near-surface oil shale resources are processed on the ground surface and then slow heating is performed in pits formed by excavating rocks for underground exploitation.

Although the exploitation, processing, utilization and the like of the oil shale has been advanced worldwide, many problems including improvement of energy efficiency and reduction of energy demands, minimization of water consumption and protection of surface water and underground water due to the on-ground processing and the underground processing, decrement, utilization and disposal of discarded slag, development of infrastructures to meet various demands to energy and mineral resources, and reduction of risks, mitigation and settlement of potential social economic factor, etc. still exist. The exploitation of the oil shale must be enforced due to global energy shortages.

The conventional oil shale exploitation method has the disadvantages of high technical energy consumption, low economic efficiency, serious pollution to underground water, and complicated processes.

DESCRIPTION OF THE INVENTION

It is an objective of the invention is to provide an oil shale exploitation method to overcome one or more than one problems in the prior arts. The method comprises: feeding oxygen-containing gas (e.g. oxygen) and combustible gas through different gas inlet pipelines, and then igniting and conveying the oxygen-containing gas and the combustible gas to the underground oil shale bed through the pipelines to heat the oil shale mineral layer by self-heating and external heating so as to produce oil gases, thereby reaching fast, large-scale, economical and reasonable exploitation for the oil gases from the oil shale mineral layer.

According to the invention an oil shale exploitation method is provided. The method comprises: forming a gas inlet pipeline and a gas outlet pipeline in an oil shale; forming a gasification channel that connects the gas inlet pipeline and the gas outlet pipeline in the oil shale; feeding combustible gas and oxygen-containing gas into the oil shale through different gas inlet pipelines, and then igniting, in an aerobic environment, the combustible gas fed into the oil shale at the lower opening of the pipeline for conveying the combustible gas, so as to heat the oil shale; and recycling through the gas outlet pipeline an oil-gas mixed product formed after thermal decomposition of kerogen in the oil shale.

Preferredly, the method further comprises: pressurizing the gasification channel to form gaps in the oil shale.

Preferredly, the method further comprises: separating $CO_2$ from the gas discharged from the outlet gas pipeline, and introducing the separated $CO_2$ into the oil shale through an independent pipeline or annulus pipe, wherein the annulus pipe is a channel portion disposed between two concentric pipelines.

Preferredly, the method further comprises: separating combustible gas from the oil-gas mixed product recycled from the outlet gas pipeline, and introducing the combustible gas into the oil shale through an independent pipeline or annulus pipe, wherein the annulus pipe is a channel portion disposed between the two concentric pipelines, and the combustible gas comprises methane or propane or a combination thereof.

Preferredly, the step of pressurizing comprises pressurization performed by gas or fluid as a pressurizing medium.

Preferredly, the step of heating the oil shale comprises: introducing the combustible gas into the oil shale through an independent pipeline externally, wherein the combustible gas comprises methane or propane or a combination thereof.

Preferredly, the communication of the outlet gas pipeline with the inlet gas pipeline is achieved by horizontal drilling or filling of high pressure gas or adding of water therebetween.

Preferredly, the oxygen content of the oxygen-containing gas is more than 20%, or the oxygen-containing gas is oxygen. In the invention, the exploitation of the oil shale mineral layer is done in a simple, cost-efficiency and practical process manner, with being environmental-friendly. The method has simple process and low energy consumption, and is capable of heating kerogen in the oil shale, thereby exploiting an oil shale mineral layer more economically and reasonably to obtain an oil-gas product.

BRIEF DESCRIPTION OF THE DRAWINGS

The above and/or additional aspects and advantages of the invention will become clear and understood easily by way of embodiments with reference to the accompanying drawings, in which.

DETAILED DESCRIPTION OF ILLUSTRATIVE EMBODIMENTS

With regard to the above problems in the prior arts, an oil shale exploitation method is provided. The embodiments of the invention will be described in detail, and the examples in the shown embodiments are illustrated in the accompanying drawings. It will be understood that the embodiments described with reference to the accompanying drawings are illustrative only for the purpose of explanation and not construed as limiting.

Figure 1:
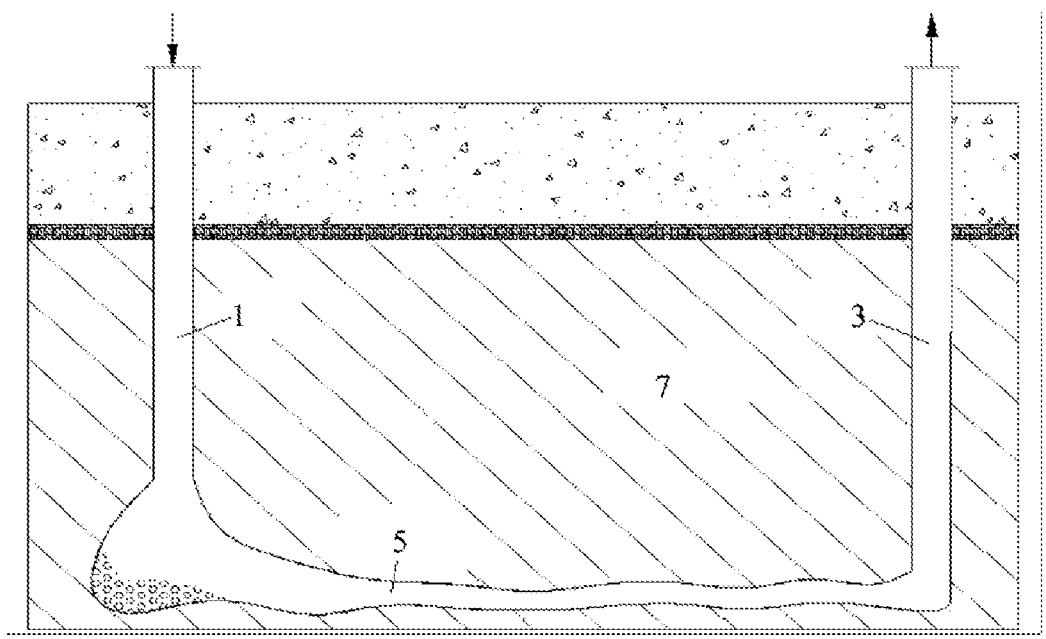
FIG. 1 is a structural diagram of underground oil shale exploitation according to embodiments of the invention.
Figure 2:
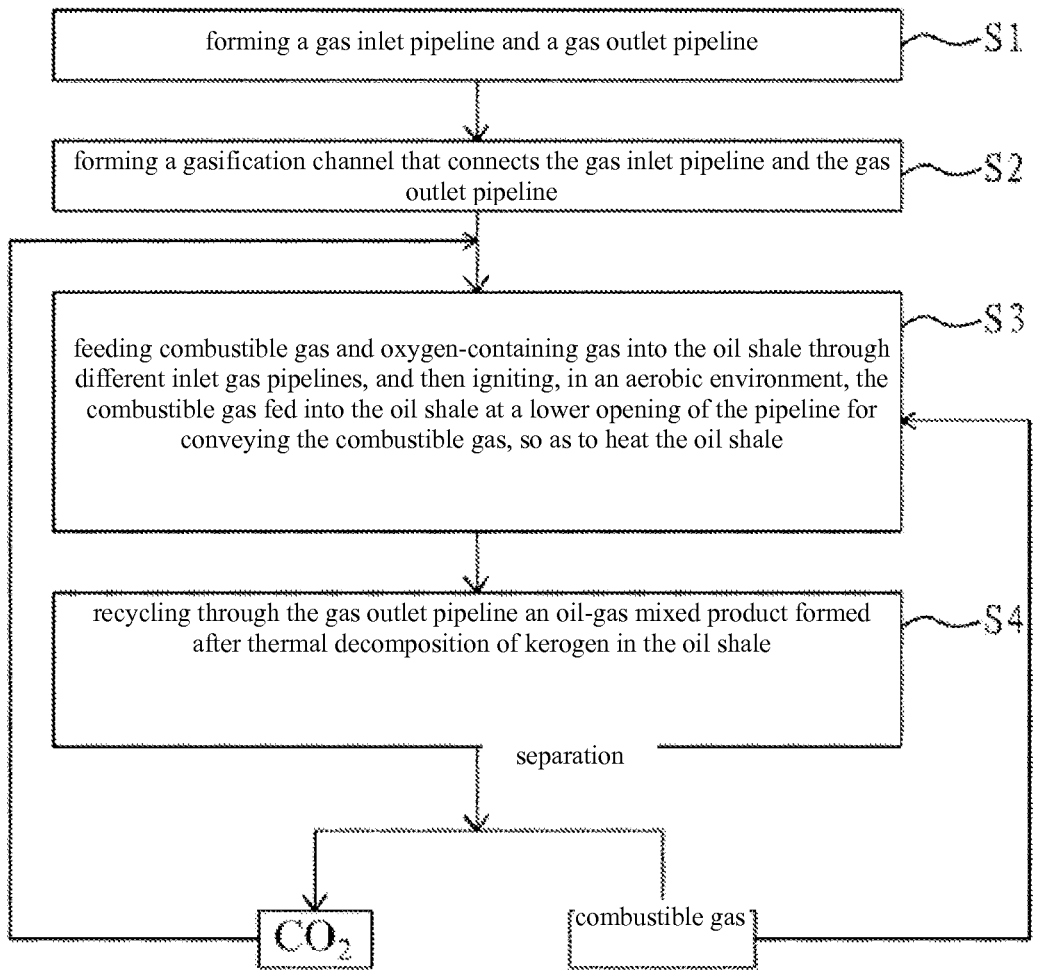
FIG. 2 is a flow chart of an oil shale exploitation method according to embodiments of the invention.

In the invention, based on the exploration details for an oil shale mineral layer, an inlet gas pipeline 1 (also referred to as an injection well) and an outlet gas pipeline 3 (also referred to as a production well) (S1 shown in FIG. 2) are arranged at a suitable well spacing by related drilling techniques, as shown in FIG. 1. An oil shale layer 7 between the inlet gas pipeline 1 and the outlet gas pipeline 3 is opened by, for example, a horizontally directional drilling technique, so as to form a prefabricated gasification channel (S2), thereby constructing a structural diagram of underground oil shale exploitation, as shown in FIG. 1. According to an embodiment of the invention, the inlet gas pipeline 1 is communicated with the outlet gas pipeline 3 by feeding high pressure gas into the inlet gas pipeline 1 so as to form a gasification channel. According to another embodiment of the invention, an oil shale layer 7 between the inlet gas pipeline 1 and the outlet gas pipeline 3 is opened by water pressure caused by filling water into the inlet gas pipeline 1, thereby forming a gasification channel 5 between the inlet gas pipeline 1 and the outlet gas pipeline 3. According to yet another embodiment of the invention, after the constructions of the inlet gas pipeline 1 and the outlet gas pipeline 3 as well as the gasification channel 5, the gasification channel is further pressurized, for example, the underground oil shale mineral layer 7 is pressurized by gas or fluid as a pressurizing medium so as to form gaps in the oil shale, which results in loosening the oil shale layer 7, thereby contributing to heating of the oil shale in the sequent operation.

Ignition is performed first after constructing the oil shale exploitation structure. An oxygen-containing gas, such as $O_2$ or a gas with the oxygen content being more than 20%, is fed through the inlet gas pipeline 1, and then a combustible gas is ignited and conveyed to the underground oil shale through a pipeline, or the combustible gas fed into the oil shale at the lower opening of the pipeline for conveying the combustible gas is ignited in an aerobic environment, so as to heat the oil shale layer by combustion of the external gas. Meanwhile, the oil shale is heated by the combustion of a part of the oil shale. That is to say, the oil shale is heated by self-heating and external heating (S3), so that an oil-gas mixed product is formed after thermal decomposition of kerogen in the oil shale. The oxygen-containing gas and the combustible gas are fed through an independent pipeline, respectively, to prevent the oxygen-containing gas and the combustible gas from exploding due to mixture thereof. Furthermore, the oil-gas mixed product is extracted from a gasifier to the ground surface through the outlet gas pipeline 3, and then lightweight oil and coal gas products are obtained by separation and the like (S4).

According to the invention, the above combustible gas, such as methane or propane or a combination thereof, may be fed directly through a dependent pipeline externally, although the above combustible gas may also be hydrocarbon gases such as methane or propane or a combination thereof separated from the oil-gas mixed product formed after the thermal decomposition of the oil shale. In addition, the combustible gas may be fed through an independent pipeline or annulus pipe, wherein the annulus pipe is a channel portion disposed between the two concentric pipelines.

According to one embodiment of the invention, $CO_2$ separated from the oil-gas mixed product formed after the thermal decomposition of the oil shale is injected back to the oil shale layer 7 through an independent pipeline or annulus pipe. For example, another pipeline for introducing the oxygen-containing gas (not shown) is disposed in the inlet gas pipeline 1, and the portion between the inlet gas pipeline 1 and the another pipeline for introducing the oxygen-containing gas is the annulus pipe through which $CO_2$ and other gases (e.g. an oxygen-containing gas and the like) injected back to the oil shale layer 7 are separated. $CO_2$ is injected back to the oil shale mineral layer to increase the amount of the hydrocarbon-containing gas in the oil shale, thereby reducing partial pressure of an olefin gas separated out of the oil shale in the gasps of the oil shale, contributing to desorption of a shale gas and other hydrocarbon-containing gases out of the oil shale, and improving the oil-gas recovery efficiency.

According to another embodiment of the invention, a combustible gas separated from the oil-gas mixed product obtained through the outlet gas pipeline 3 is returned to the oil shale mineral layer for combustion to provide fuels for heating the oil shale mineral layer, so that an oil-gas mixed product is formed after the thermal decomposition of the kerogen.

The invention includes constructing a number of inlet/outlet gas pipelines in the oil shale mineral layer by drilling, forming a gasification channel between the inlet and outlet gas pipelines in the underground mineral layer in a pressurizing and fracturing manner, feeding an oxygen-containing gas through the inlet gas pipeline, igniting and conveying the oxygen-containing gas to the oil shale layer to heat the oil shale by self-heating and external heating so as to form an oil-gas mixed product after the thermal decomposition of kerogen. Thus, tars and/or other products which may be produced from the oil shale mineral layer is obtained from the production well, the combustible gas obtained may be partially returned to the oil shale mineral layer for combustion to heat the oil shale so as to continue to product the above product. Thus, fast, large-scale, economical and reasonable oil-gas exploitation from the oil shale mineral layer is achieved.

Although the embodiments of the invention have been illustrated and described, it will be appreciated by those skilled in the art that various changes, modification, substitutions and variants would be made without departing from the principle and spirit of the invention as defined by the appended claims, and the scope of the invention is defined by the appended claims.

The invention claimed is:
1. An oil shale exploitation method, wherein comprising:
   forming a gas inlet pipeline as a heating well and a gas outlet pipeline as a production well in an oil shale;
   forming a gasification channel that connects the gas inlet pipeline and the gas outlet pipeline in the oil shale;
   feeding combustible gas and oxygen-containing gas into the oil shale through different gas inlet pipelines, and then igniting, in an aerobic environment, the combustible gas fed into the oil shale at a lower opening of the pipeline for conveying the combustible gas, so as to heat the oil shale, and thereby obtaining an oil-gas mixed product from thermal decomposition of kerogen in the oil shale;

extracting the oil-gas mixed product through the gas outlet pipeline to a ground surface; and separating a gas comprising at least one of $CO_2$ and a combustible as from the oil-gas mixed product, and introducing the separated gas into the oil shale.

2. The method of claim 1, further comprising: pressurizing the gasification channel to form gaps in the oil shale.

3. The method of claim 2, wherein the step of pressurizing comprises pressurization performed by gas or fluid as a pressurizing medium.

4. The method of claim 2, wherein the $CO_2$ is separated from the oil-gas mixed product, and introduced into the oil shale through an independent pipeline or annulus pipe, wherein the annulus pipe is a channel portion disposed on between two concentric channels.

5. The method of one of claim 2, wherein the combustible gas is separated from the oil-gas mixed product, and introduced into the oil shale through an independent pipeline or annulus pipe, wherein the annulus pipe is a channel portion disposed between two concentric channels.

6. The method of claim 5, wherein the combustible gas comprises methane or propane or a combination thereof.

7. The method of claim 1, wherein the $CO_2$ is separated from the oil-gas mixed product, and introduced into the oil shale through an independent pipeline or annulus pipe, wherein the annulus pipe is a channel portion disposed on between two concentric channels.

8. The method of one of claim 7, wherein the combustible gas is separated from the oil-gas mixed product, and introduced into the oil shale through an independent pipeline or annulus pipe, wherein the annulus pipe is a channel portion disposed between two concentric channels.

9. The method of claim 8, wherein the combustible gas comprises methane or propane or a combination thereof.

10. The method of one of claim 1, wherein the combustible gas is separated from the oil-gas mixed product, and introduced into the oil shale through an independent pipeline or annulus pipe, wherein the annulus pipe is a channel portion disposed between two concentric channels.

11. The method of claim 10, wherein the combustible gas comprises methane or propane or a combination thereof.

12. The method of claim 1, wherein the step of heating the oil shale comprises introducing the combustible gas into the oil shale through an independent pipeline externally.

13. The method of claim 12, wherein the combustible gas comprises methane or propane or a combination thereof.

14. The method of claim 1, wherein the outlet gas pipeline is communicated with the inlet gas pipeline by horizontal drilling, filling of high pressure gas, or adding of water therebetween.

15. The method of claim 1, wherein oxygen content of the oxygen-containing gas is more than 20%, or the oxygen-containing gas is oxygen.

* * * * *